UNITED STATES PATENT OFFICE.

ERICH SAUL, OF FRANKFORT-ON-THE-MAIN, GERMANY, ASSIGNOR TO CASSELLA COLOR COMPANY, OF NEW YORK, N. Y.

YELLOW-OLIVE DYE AND PROCESS OF MAKING SAME.

No. 904,809.  Specification of Letters Patent.  Patented Nov. 24, 1908.

Application filed December 31, 1907. Serial No. 408,859.

*To all whom it may concern:*

Be it known that I, ERICH SAUL, a citizen of Germany, and a resident of Frankfort-on-the-Main, Kingdom of Prussia, have invented a new and useful Yellow-Olive Dyestuff and Process of Making Same, of which the following is a specification.

I have discovered that by melting meta-toluylenediamin and para-phenylenediamin together with sulfur, a body is obtained which on being heated with concentrated solutions of alkaline sulfids or caustic alkalies, is transformed into a dyestuff soluble in water. This dyestuff may be obtained by precipitation from the diluted melt, and dyes from a sodium sulfid bath unmordanted cotton a yellow-olive shade of a fastness to washing, light and chlorin hitherto unattainable. As such khaki shades are of importance for dyers, the new coloring matter is of particular technical value.

The new process of manufacture is illustrated by the following examples:—

Example I: 12 kilos para-phenylenediamin, together with 10 kilos meta-toluylenediamin and 50 kilos sulfur, are heated gradually to 200° C.; the temperature is then raised and kept for about four hours at 200-240° C. When cold the melt is pulverized, and as much as three times the weight of crystallized sodium sulfid added together with a little water; this mixture is heated to and kept at 115° C. until a sample taken from the melt keeps clear on being diluted. The melt is then diluted with cold water and the dyestuff precipitated with dilute acids, or by the introduction of air, or by the addition of salts of lime, salts of ammonia, etc., etc.

Instead of heating the toluylenediamin and the phenylenediamin at once with sulfur, the melt may be performed in two operations by first producing the so-called thio-toluylenediamin from meta-toluylenediamin and sulfur, and heating this thioderivative with para-phenylenediamin.

Example II: The thiocompound obtained by heating 42.2 kilos meta-toluylenediamin and 150 kilos sulfur for eight hours at a temperature of 185° C. is pulverized together with 50 kilos para-phenylenediamin, and the mixture is kept at about 220° C. for some hours. The melt is then treated exactly as described in Example I.

The thus produced coloring matter shows the following characteristics. It is insoluble in neutral or acid solutions, almost insoluble in concentrated sulfuric acid, easily soluble in the presence of alkaline sulfids with a yellowish brown color and dyes unmordanted cotton from such a solution in yellow-olive shades.

Having now described my said invention and in what manner the same is to be performed, what I claim is:

1. The yellow-olive dyestuff which is produced by melting meta-toluylenediamin and para-phenylenediamin together with sulfur and transforming the product into a soluble compound which is a dark powder insoluble in neutral or acid liquids, easily soluble in presence of alkaline sulfids and dyeing unmordanted cotton from such solution in fast yellow-olive shades substantially as described.

2. The process of producing a yellow-olive dyestuff by melting meta-toluylenediamin and para-phenylenediamin together with sulfur and transforming the product into a soluble compound by heating it with alkaline sulfids or caustic alkalies substantially as described.

In witness whereof I have hereunto signed my name this 17th day of December 1907, in the presence of two subscribing witnesses.

ERICH SAUL.

Witnesses:
 JEAN GRUND,
 CARL GRUND.